Feb. 22, 1927.  
C. C. WORTHINGTON  
TRACTION GANG LAWN MOWER  
Filed May 20, 1921  
1,618,502  
2 Sheets-Sheet 1
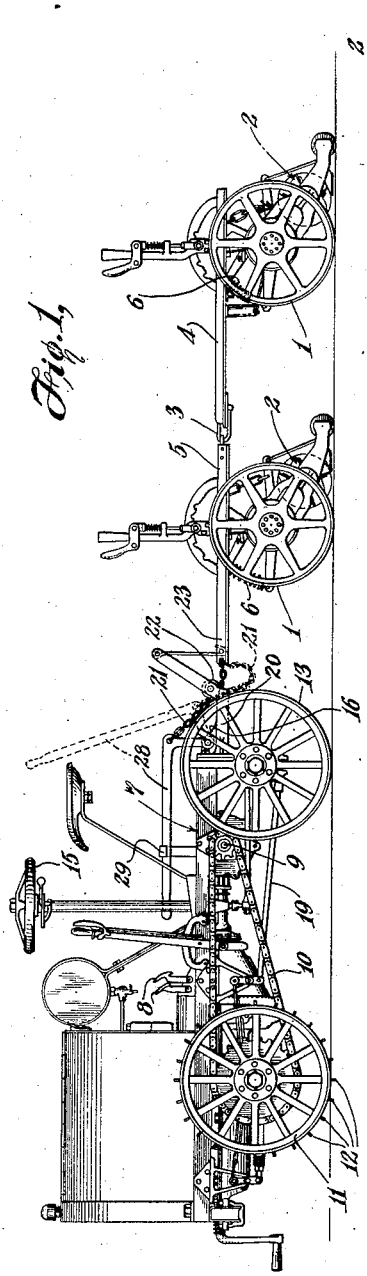
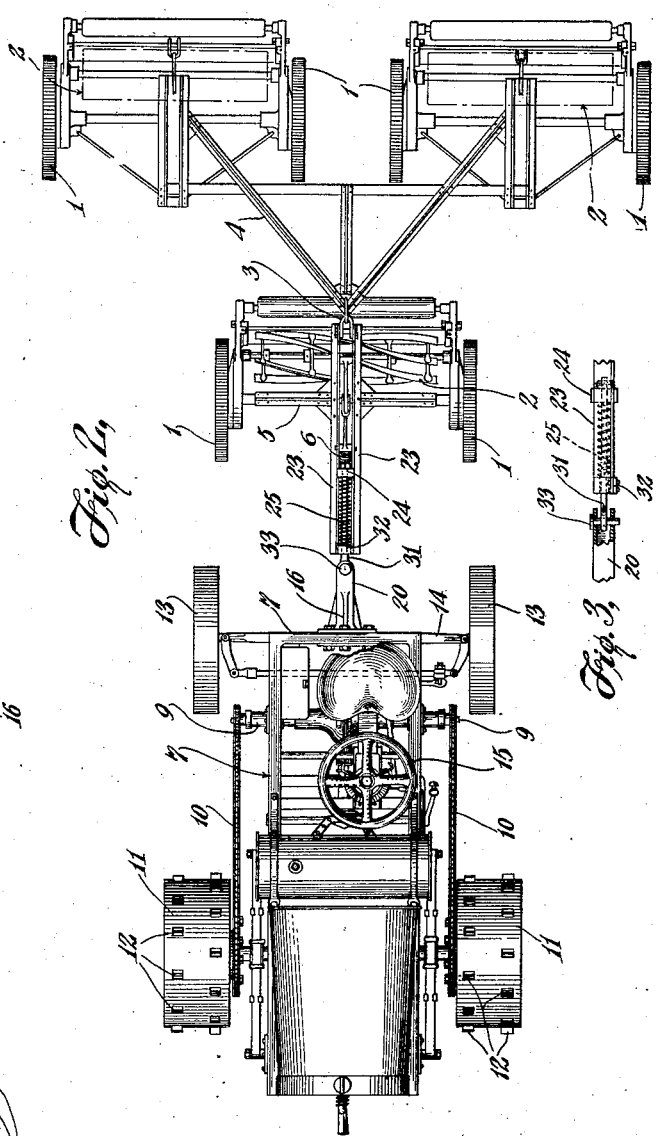
Charles C. Worthington INVENTOR
BY Jeffery Kimball Eggleston
ATTORNEYS

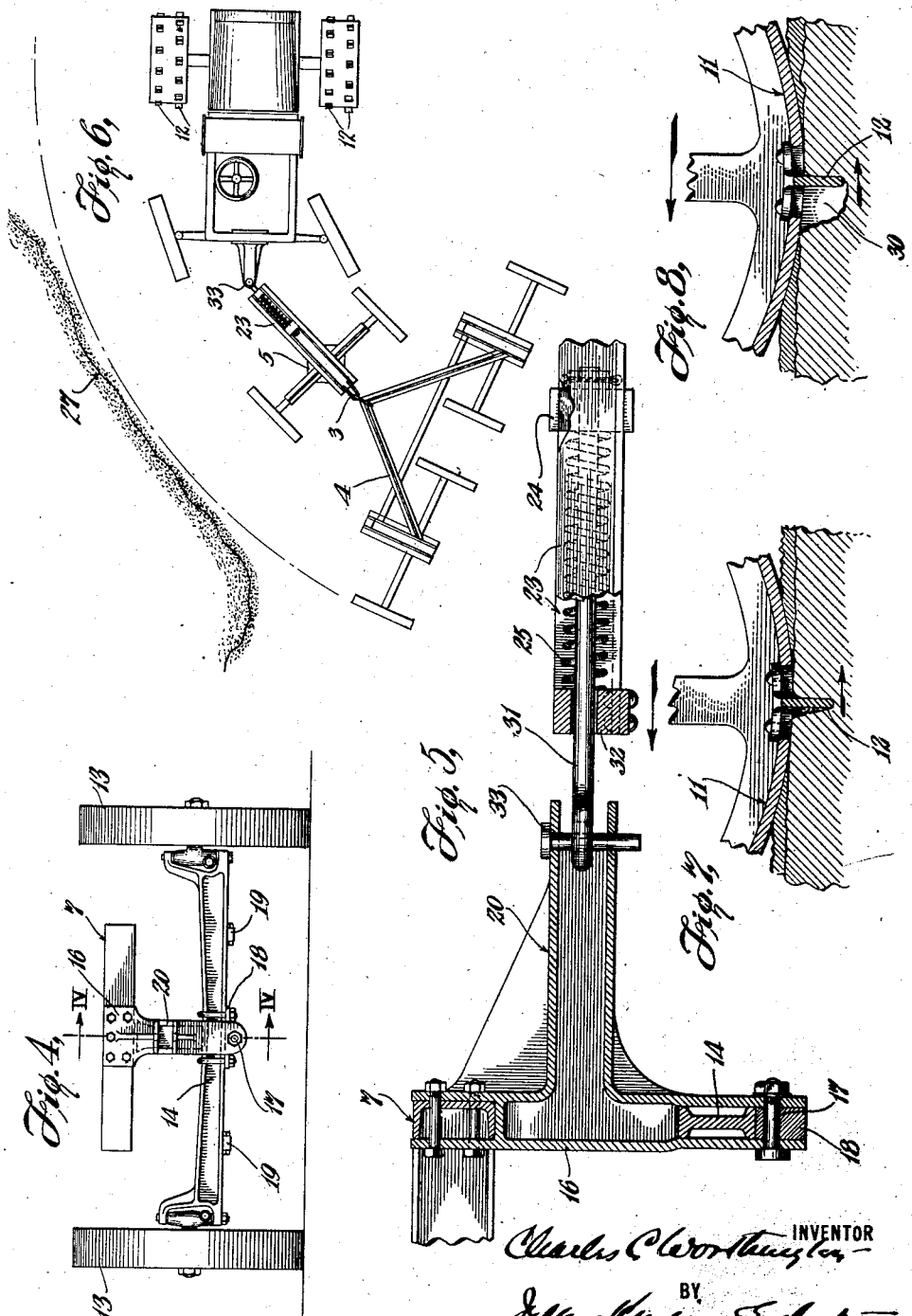

Patented Feb. 22, 1927.

1,618,502

UNITED STATES PATENT OFFICE.

CHARLES C. WORTHINGTON, OF DUNFIELD, NEW JERSEY.

TRACTION GANG LAWN MOWER.

Application filed May 20, 1921. Serial No. 471,130.

The invention relates to power drawn gang lawn mowers and its object is to provide a combination of automotive mechanism and lawn mower units which is free from the serious defects which have developed in the effort to use for this service, particularly on golf courses, automobiles or tractors steered by their front wheels. When such a tractor is used with a gang of lawn mower units, the latter are hitched to a central rear point on the tractor frame. When, with this arrangement of tractors and mowers, the course is a straight one, the swath cut by the mowers extends an equal distance on each side of the tractor as the swath is considerably wider than the tractor gage. But when it becomes necessary to mow a curved swath, close to sand-pits, bunkers, etc., the gang units depart from this central relation to the tractor and follow a curve of less radius, which shortens the extension of their swath on the outside of the curve to a limit of about the outside curve of the traction wheels. This change in the relation between the curved path mowed by the gang units and that travelled by the tractor, makes it unsafe to drive the tractor close enough to the pits and bunkers to cut the grass along their edges—any attempt to draw them over the grass must be made at the risk of caving the bank of the pit under the weight of the tractor or striking the bunker and fracturing some part of the machine. The practical effect of this change in the relative paths of the tractor and mower is to confine the use of the combination to such portions of the course as are free from such dangerous obstructions and to leave much mowing to be done by other means.

In adapting, for this service, the ordinary tractors on the market, it is found that their weight upon the drive wheels is so great as seriously to injure the turf; the rolling action of their tires compressing the ground and hardening the surface to a degree that finally destroys its growth. This grave objection practically prohibits the use of the ordinary tractor and limits the employment on this service, to those which are especially designed of as light weight as is mechanically possible. It is obvious that such light machines will be deprived of much of the draft-traction, that heavier ones by reason of their weight possess. What remains of their normal traction must therefore be augmented through the placing of numerous cleats upon the driving wheel tires. If however these cleats are made deep enough to meet the maximum draft demand of the cutting operation they are found to make very objectionable cuts or gaps in the turf. They leave openings where they have penetrated the ground, often large enough to ruin the fairway of a golf course and to render it unfit for expert play. Whenever the tractor-drawn outfit is started from rest or increased in speed, the cleats press the turf rearwardly, compacting it horizontally, and make and leave indentations in the lawn, which are much wider than the thickness of the cleats themselves and are not only unsightly and injurious, but become hiding places for golf balls. The cleat action is the more injurious because the cleat in withdrawing from the gap it has made, tends to lift the compacted clot in the rear of it and thereby breaks the roots of the grass plants resulting in a dead spot in the lawn which is slow of recovery. These difficulties and defects which present themselves to the introduction of tractor-drawn mowers in the service of lawn cutting, constitute the problems which are solved by the present invention. This invention relates to an organization of tractor and mower units forming in combination an apparatus which effectually overcomes all the difficulties referred to and provides an equipment which can operate safely anywhere over a lawn regardless of the close proximity of obstructions and without leaving any objectionable marks upon the turf nor injuring its growth. To this end the invention concerns the draft connection between the tractor and the mower; the relation of the tractor steering wheels to the cutting action of the mower and other features peculiarly adapting the entire equipment to the purposes stated.

The accompanying drawings illustrates the principle of the invention in its preferred form, Fig. 1, being a side elevation of the tractor with a three unit gang and a distensible chain hitch to the latter.

Fig. 2, is a plan of Fig. 1, with a spring-restored hitch.

Fig. 3 is a side elevation detail of said hitch,

Fig. 4, a rear elevation of the tractor as used for the spring-restored hitch.

Fig. 5 an enlarged sectional detail of the bolster bracket and tractor draft arm.

Fig. 6, a diagram illustrating the action of the equipment in negotiating a curved course, and Figs. 7 and 8 are diagrams of the cleat action.

The lawn mower gang comprises three or more ordinary lawn mower units each having ground wheels 1 and rotary cutters 2 driven through gear-trains by such wheels as usual; and all of them being united and held in proper overlapping relation by a frame structure, which is preferably, though not necessarily, supported in part upon the units themselves. The frame structure may be variously constituted, either partly or wholly comprised of rigid frame members and its connection to the units permits them to tilt in the vertical planes of the axes of their respective ground wheels and allows the cutter mechanism of each unit to rise and fall turning about the said wheel-axis, so that each unit is thus individually free to take the inclination of the lawn surface it travels over, and is also adapted to be operated with its cutter lifted as when it is desired to make a high cut. In the preferred design shown in the drawings, which is not substantially different from the lawn mower gang shown in my co-pending application Serial No. 381,029, the frame is composed of front and rear rigid skeleton sections connected by a hook or clevis 3 which constitutes, in effect, a universal joint permitting the unit or units which form the rear row of the gang to assume different horizontal angles with respect to the unit or units forming the front row as when the gang moves in a curved path, and also allowing the entire rear row when necessary to assume a different vertical angle than that of the front row, thus adapting the gang in its entirety to accommodate every kind of ground undulation. The rear frame section 4, which in the present case spaces and flexibly unites two lawn mower units, is supported partly by said units and partly by the clevis joint to the front section 5 and the latter is similarly supported in sulky fashion on the front unit and maintained in horizontal position by its draft connection with the tractor, both sections normally occupying a plane which is, in general, parallel to the lawn surface. Each frame section carries for each unit a latching hand lever, and suitable connections including a spring 6, for lifting the rear roller and cutter mechanism and holding it at different elevations from the ground to vary the height of the cut, as well as for imposing more or less downward spring pressure upon such mechanism adapted to keep it from kicking up when it encounters heavy grass, this arrangement being also according to the disclosure in my said application. While the foregoing organization of the gang lawn mowers is specially suited to tractor operation, this invention is by no means limited to the style of gang shown. It must be understood that a mower or mowers of any other type or design capable of being combined with a tractor, may be used without departing from the scope of this invention and that the advantages of this invention are realized when the apparatus drawn by the tractor is other than mowers, such for example, as rotary brooms, etc. operated upon a lawn or fairway in combination with these improved draft means. They are to be read herein as if specifically described and illustrated.

The tractor comprises a main frame 7 supported on front and rear wheels and carries an internal combustion engine and its associated power transmission mechanism, steering means and operator's seat. The whole design is based upon the elimination of all superfluous weight. The engine is of the unit-power-plant type and is enclosed in a bonnet which conceals it in the drawing; its change speed gearing is operated by pedals 8 and its power is transmitted rearwardly by a propeller shaft to a differential jack shaft 9 mounted on the rear part of the frame 7 and connected by sprocket chains 10 to the traction wheels 11 which are the front wheels of the vehicle. This arrangement enables practically the whole weight of the engine, and much of the whole power plant load to be carried on liberal springs on the front axle and eliminates the need for springs with their added weight at the rear axle. The front traction wheels are provided with thin blade cleats 12 disposed in staggered relation on their broad flat treads and each is associated with an opening in the tread on one or both sides, by means of which it is made self-clearing of cakes of mud or matted grass likely to make cup-shaped indentations in the turf, but the particular style of ground-penetrating projection forms no part of the present invention and all wheel projections suitable for turf traction are herein referred to as cleats.

The tractor is steered by its rear wheels 13, which are for this purpose journaled on automobile type steering knuckles at the ends of the rear axle 14 and connected by appropriate linkage to the steering column 15, placed in front of the operator's seat.

The rear end of the tractor frame is supported on the rear axle 14 by means permitting said axle to oscillate freely in a vertical plane with reference to the vehicle frame and without tendency to tilt the latter sideways. This enables the vehicle frame to take always the angle of its front wheels, undisturbed by such angular position as the ground may give to the rear axle. The tendency for the tractor to acquire a forward pitching motion when driving over hummocks is greatly reduced by the absence of any substantial spring action in its support on the rear axle, and the draft pull on the gang is kept uniform, which is essential for effective gang mower propulsion. For this purpose the vehicle frame is connected to the rear axle by a combined bolster and draft bracket 16, shown more fully in Fig. 4, this rigid member being bolted to the rear cross bar of the tractor frame and at its lower end straddled over the rear axle 14, as indicated in Fig. 4 where it is pinned by a bolt 17 to the pivot bearing 18 which latter is clamped to the underside of the axle thereby forming a rear pivoted frame support of the kind mentioned, but it will be apparent that the detail of the construction of such a pivotal bearing is capable of much variation in design. It is desirable to locate such pivotal axis below the axis of the steering wheels and also to steady the rear axle in some way, as by a pair of reach-rod links 19 connected to forward points on the underside of the frame as indicated in Fig. 1.

The bolster bracket 16 is provided with a rearward draft arm 20 detachably and pivotally or flexibly, connected to a forward part of the gang frame as later described. Such arm is preferably rigid with the bracket, being cast in one piece therewith, but it is only essential that it be maintained central, substantially parallel with the vertical longitudinal plane of the tractor. Its point of attachment to the gang frame is at the normal level of the latter and somewhat to the rear of the rear axle and its wheels. By reference to the diagram of Fig. 6 it will be observed that by hitching the gang to the point mentioned an angular setting of the rear steering wheels 13, as in turning a curve, has the effect of throwing the gang further to the outside of the curve than would be the case if the steering were done by the front wheels or if the rearwardly extended draft arm were not used. It will be noted that the course or swath of the gang may thus be caused to approach very closely to the edge of the declivity 27 while the path followed by the front traction wheels 11 is safely remote from it, and also that the path of the rear steering wheels is also well removed from danger, this being in the main the effect of the rear steering but also of hitching the gang frame to a point well in rear of the rear axle. According to this invention the said tractor features are combined with a new principle of gang mower traction which in practice is found to eliminate all chance of injury to the lawn under any circumstances. I have ascertained that if the weight of a tractor for this lawn service is reduced to the point where its wheels do not objectionably compress and harden the ground, these wheels cannot be equipped with cleats wide or deep enough to give them the amount of traction needed, except at the risk of having them wear and deface the ground in the manner before described. If cleats of a depth which can be safely employed are used, they are sufficient for the normal working draft but prove inadequate under the added stress of the inertia of the load at starting. This additional strain causes them to compress the narrow section of ground against which they push, as in the manner shown in Fig. 8 making the slot in the turf so wide as to be very objectionable. To avoid this compression, which takes place only at the moment of starting the load, I provide lost motion in the draft connection between the load and the tractor. When under way, the narrow cleats which can now be used, afford sufficient traction without danger of making any mark on the turf, except a narrow unobjectionable slot where the cleat enters, see Fig. 7. When the tractor attempts to start the mower from a state of rest the extra pressure upon these cleats due to the inertia of the load would nevertheless cause them, without the application of my invention, to compress the soil against which they are fulcrumed as in Fig. 8. This compression is entirely obviated by providing lost motion or a tow-line effect in the draft arm. With this the tractor starts without the load. Having gained headway it is enabled to start the load by force of its momentum, as soon as the slack or lost motion in the draft connection is taken up. In this way the pressure on the cleats is held substantially uniform during all conditions and a uniform narrow width of cut results in the turf. Instead of starting with accelerating speed, as the tractor starts, the load on the draft means is jerked into motion, so to speak, at the moment when the slack is taken up.

Very heavy gangs of large sized or poorly oiled units can thus be started as often as desired without leaving any greater sign on the ground than occurs when under normal headway. Such tow-line effect may be produced by the use of a distensible chain hitch as indicated in Fig. 1 where the draft arm 20 is connected by a chain 21 with the forward arm or tongue structure 23 of the gang frame. The chain runs under a roller 22 at the end of the draft arm 20 and is connected to the heel of a bent lever 28 fulcrumed on the draft arm, the lever handle being extended forwardly to a point adjacent and to one side of the operator's seat where it can be easily pushed down and locked under a fixed hook 29. The lever serves to shorten the hitch when in the full line position of Fig. 1 which shows the normal draft relation. The operator releases the lever and puts it in its dotted line position on stopping or prior to starting so as to make a slack in the chain, as also shown by the dotted lines. When the tractor starts forward it acquires headway before the chain tautens and starts the gang, and after both are under way, the operator restores the lever to its normal (full line) position and locks it under the hook. The link 22ª connected between the end of the tongue 23 and the upstanding bracket 20ª on arm 20 serves merely to keep the mower frame in horizontal or normal position, when the chain is distended. The effect of thus getting the tractor under way before it takes up the load of the lawn mower units is illustrated by the diagrams, Figs. 7 and 8, wherein it will be observed that the cleat 12, which is embedded in the ground when the tractor is at rest, tends to exert a rearward pressure, in the direction of the small arrow, as the traction wheel 11 starts to rotate forwardly or to the left. If the tractor starts without the very considerable load of the gang (Fig. 7) the horizontal compression of the turf is not so great but that on continued rotation, the cleat will withdraw leaving a slit not much wider than its own thickness, and which is not sufficient to hurt the lawn, or be objectionable on a golf course, and is in fact beneficial. When the lost motion of the slack chain is taken up the gang is started entirely by the effect of the tractor's momentum, and not by the effect of the engine torque, and this also and very obviously produces no mark on the lawn. If, however, the tractor and the gang be rigidly connected so that the tractor must coincidently start itself and the gang load by the active torque of the engine, it is found that the horizontal cleat pressure against the turf so compresses the latter in the direction of the arrow as to produce the condition roughly indicated by Fig. 8, making a wide void or gap 30, which as already explained is unsightly and injurious to the turf and quite large enough to spoil the lie of a golf ball which happens to lodge in it.

The particular means of providing a lost motion draft connection between the tractor and the gang, so as to produce the effect just explained, and also its location in the equipment are manifestly matters which are subject to modification as circumstances of the gang design or preference may require. An individual lost motion connection might be provided to each unit, with substantially the same effect. Figs. 2 and 3 show a preferred form of lost motion hitch which is automatically restored after distension by the action of a spring. In this case the two members 23 of the draft arm of the front frame section form between them a housing for a sliding eye-bolt link 31 which is pressed rearwardly therein by a spring 25 inserted between its cross-head 24 and the front spacer block 32 of the frame arm. The link is detachably connected to the tractor or its draft arm 20 by a pin 33 and can swing horizontally and to some extent vertically thereon, while its connection to the gang frame is in the nature of a swivel. The general arrangement is not unlike railway draw-bar design, but the tension of the spring is determined, not with reference to the normal traction afforded to the driving wheels as to which with the aid of the cleats employed, there is no difficulty whatever, but with reference to the average horizontal compressibility of the turf under the pressure of the cleats. The said spring is adapted to be compressed in starting without impairing the tow-line effect of the hitch and may normally run fully collapsed against the spacer 32, its principal function being to restore the link to its telescoped condition as the tractor slows down in coming to a stop so that the lost motion will be again available on the next start. It is designed to be practically inert so far as any effect on the draft of the tractor at starting is concerned but to exercise its extension force upon the draft only at the time the tractor is coming to a state of rest. It compresses when the inertia of the load at starting is exerted upon it so that the mower may be put into action principally and mainly by the momentum of the tractor and should resume its extended shape only when the tractor slows down and the momentum of the mower decreases the draft pull sufficiently; it is thus a substitute for the hand lever take-up 28, but automatic in its operation and on that account preferred although the invention is not limited to such spring yielding take-up, except as particularly specified in the following claims.

I claim:—

1. Traction lawn mower equipment comprising a gang of lawn mower units having ground wheels and rotary cutters driven thereby, a gang frame flexibly uniting and spacing said units and individually permitting them to accommodate ground undulations, a self-impelled vehicle supported on front and rear wheels and carrying an engine driving the front wheel or wheels and a steering means controlling the rear wheel or wheels and draft connection means between the rear of said vehicle and said gang, the several parts being mutually organized and related to cause the center of the swath cut by the gang to swing toward the outer side of a curved path taken by said driven front wheels.

2. Traction lawn mower equipment comprising a gang frame uniting and spacing a plurality of lawn mower units comprising ground wheels and rotary cutters driven thereby, a forwardly extending draft arm on said frame, a self-impelled vehicle having a driven front wheel or wheels and a rear steering wheel or wheels and a pivotal joint between said draft arm and the vehicle located adjacent the axle of said steering wheels.

3. Traction lawn mower equipment comprising a gang frame having a forwardly extending draft arm, a gang of lawn mower units flexibly united and spaced by said frame, a self-impelled vehicle having a driven front wheel or wheels and a rear steering wheel or wheels and provided with a rearwardly extending draft arm pivotally connected to the forwardly extended draft arm of said gang frame.

4. Traction gang lawn mower equipment comprising a self-impelled vehicle having driven front wheels provided with turf engaging cleats and a rear wheel or wheels provided with means for steering them, in combination with a gang lawn mower frame and a gang of lawn mower units united and spaced thereby and provided with rotary cutters and ground engaging wheels having gear-trains to drive the same and lost motion draft means between said vehicle and units operating to permit the vehicle to acquire headway before starting said rotary cutters in operation.

5. Traction gang lawn mower equipment comprising a rear-steered self-impelled vehicle having cleats on its driven front wheel or wheels, a rear draft arm extended rigidly to the rear of the axis of the steering wheel or wheels, a gang frame provided with a forwardly extended draft arm and a combined lost motion and pivotal connection between said arms.

6. Traction gang lawn mower equipment comprising a self-impelled vehicle provided with a rear-steering wheel and a gang frame constituted of front and rear sections universally-jointed together, the front section having a forward draft arm universally-jointed to the rear of said vehicle.

7. Traction gang lawn mower equipment comprising a self-impelled vehicle provided with a rear-steering wheel, a gang frame formed of front and rear universally-jointed sections, a forwardly extending draft arm on the front section and a rearwardly extending draft arm on said vehicle, universally-jointed to said forward frame arm.

8. The combination of a gang lawn mower comprising a plurality of ground wheels and rotary cutters driven thereby, engine-driven tractor wheels for propelling said gang, cleats on said tractor wheels, draft members providing a lost motion connection between said cleated tractor wheels and said gang and operating to prevent enlargement of the cleat marks in the lawn and means for restoring the position of said draft members.

9. In a gang lawn mower, a gang of lawn mower units each having ground wheels, a gang frame connected to said units and having front and rear sections, the front section having spaced members extending in the central longitudinal vertical plane of the front unit in the line of draft, a yielding draft connection or coupling carried by said frame between said members, and front unit adjusting mechanism also located between said members.

10. Traction gang lawn mower equipment comprising a self-impelled vehicle having a driving wheel or wheels, cleat members thereon adapted to penetrate the turf, a plurality of lawn mower units, the latter having ground wheels and rotary cutters driven through gearing thereby and lost motion connection means between said vehicle and lawn mower units adapted to distend and permit the said cleated-wheel vehicle to move relatively to the several lawn mower units, and means for retracting said connection means.

11. Traction gang lawn mower equipment comprising a self-impelled vehicle having turf-engaging cleats on its driven or traction wheel or wheels, a gang lawn mower comprising a frame uniting and spacing lawn mower units, said units comprising ground wheels, gear-trains driven thereby and rotary cutters driven by said gear-trains in combination with connection means between said vehicle and gang frame comprising relatively movable members operating to permit the vehicle to move relatively to the gang and thereby prevent enlargement of the cleat marks, and spring take-up means for restoring said members.

In testimony whereof, I have signed this specification.

CHARLES C. WORTHINGTON.